United States Patent

[11] 3,588,351

[72] Inventor Leonard J. Baun
Cinnaminson, N.J.
[21] Appl. No. 714,256
[22] Filed Mar. 19, 1968
[45] Patented June 28, 1971
[73] Assignee RCA Corporation

[54] TELEVISION BLANKING AND SYNCHRONIZING SIGNAL GENERATOR
15 Claims, 34 Drawing Figs.

[52] U.S. Cl. .......... 178/69.5
[51] Int. Cl. .......... H04n 1/36
[50] Field of Search .......... 178/69.5, 69.5, 7.35, 7.55, 7.1; 328/178, 187

[56] References Cited

UNITED STATES PATENTS

| | | | |
|---|---|---|---|
| 2,655,556 | 10/1953 | Abelson | 178/69.5TV |
| 2,930,848 | 3/1960 | Fathauer | 178/69.5G |
| 3,006,995 | 10/1961 | Fathauer | 178/69.5G |
| 3,359,367 | 12/1967 | Hiatt | 178/69.5G |
| 3,443,024 | 5/1969 | Allen et al. | 178/5.4SNC |
| 3,487,166 | 12/1969 | Ryan | 178/69.5G |

*Primary Examiner*—Richard Murray
*Assistant Examiner*—John C. Martin
*Attorney*—Eugene M. Whitacre

ABSTRACT: The generator operates either in a locked mode responsive to incoming sync information or in a free-running mode. The blanking apparatus includes a 31.5 kHz. multivibrator providing the basic timing information. In the locked mode its frequency and phase are controlled by an automatic frequency control (AFC) circuit by which it is compared with the incoming sync signal. The blanking generator supplies timing information to the sync generator by which the horizontal and vertical sync signals are produced. In the free-running mode of the apparatus the basic timing unit is controlled by a preset voltage and the necessary timing of the vertical blanking intervals relative to the horizontal blanking intervals is controlled by sync signals derived from the sync signal generator and fed back via a closed loop circuit to the blanking generator. In the locked mode the timing relationship between the vertical and horizontal blanking intervals is controlled by the incoming sync signal and a counting system deriving timing information from the basic timing unit. In the latter case, the loop circuit from the sync generator to the blanking generator is opened and the horizontal and vertical timing relationship is controlled by the sync received from the external source. A mode switch, which is responsive to a sync signal detector, controls the apparatus in either of its two modes depending upon the presence or absence of sync signals received from an external source.

Inventor:
LEONARD J. BAUN
BY Eugene M. Whitacre
Attorney

Inventor:
LEONARD J. BAUN
BY Eugene M. Whitacre
Attorney

Inventor:
LEONARD J. BAUN

BY Eugene M. Whitacre
Attorney

HORIZONTAL AFC 31.5 KHZ GENERATOR

Inventor:
LEONARD J. BAUN

BY Eugene M. Whitacre
Attorney

HOR. BLANKING GEN.

BISTABLE CIRCUIT

HOR. BLANK. GATE

COMPOSITE BLANK. GEN.

RESET PULSE GATE

Inventor:
LEONARD J. BAUN

BY Eugene M. Whitacre
Attorney

Inventor:
LEONARD J. BAUN

BY Eugene M. Whitacre
Attorney

FRONT PORCH TIMING GENERATOR

EQUALIZING PULSE GATE AND GENERATOR

VERTICAL BLANKING GATE

PULSE GEN.

Inventor:
LEONARD J. BAUN

BY Eugene M. Whitacre
Attorney

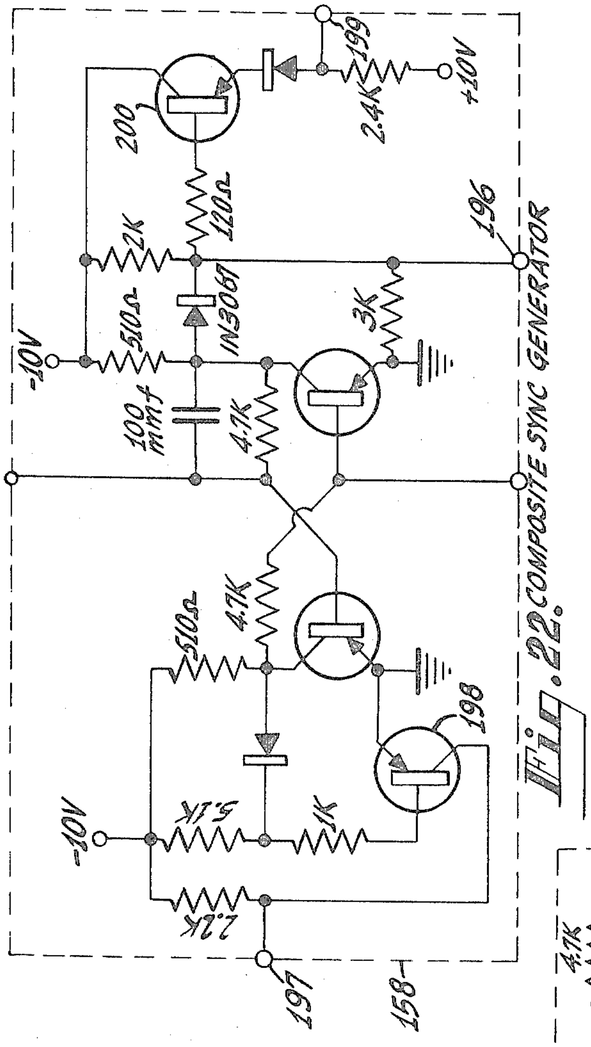
FIG. 22. COMPOSITE SYNC GENERATOR
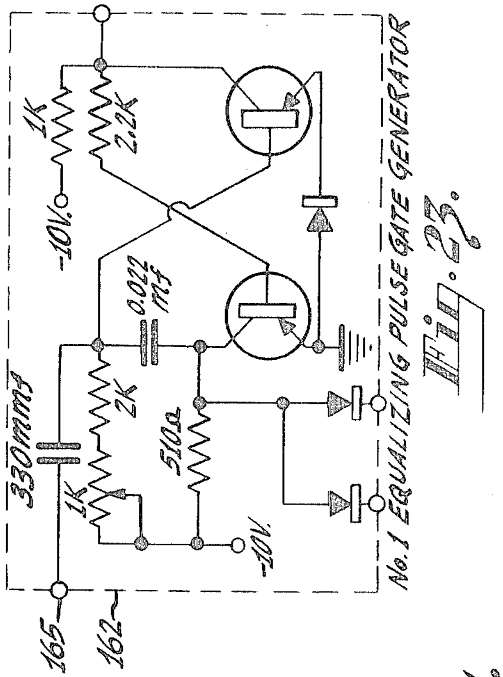
FIG. 23. No. 1 EQUALIZING PULSE GATE GENERATOR
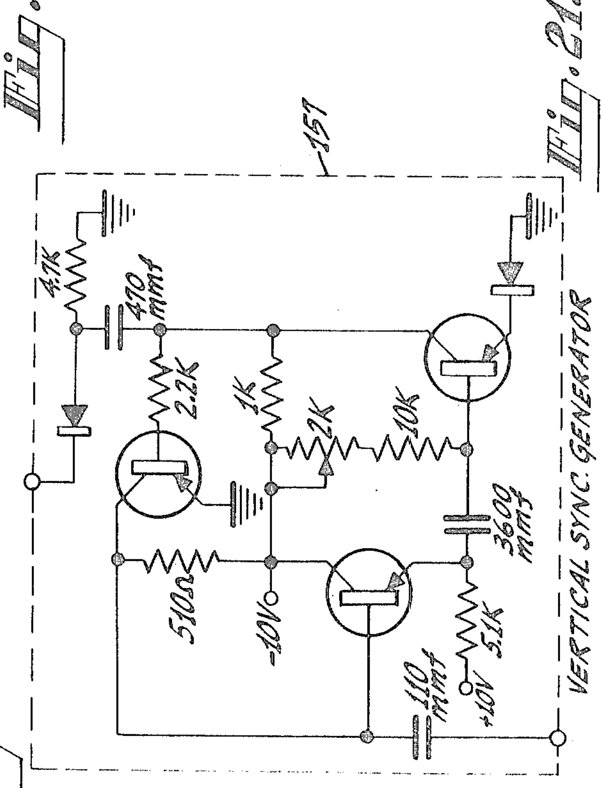
FIG. 21. VERTICAL SYNC. GENERATOR
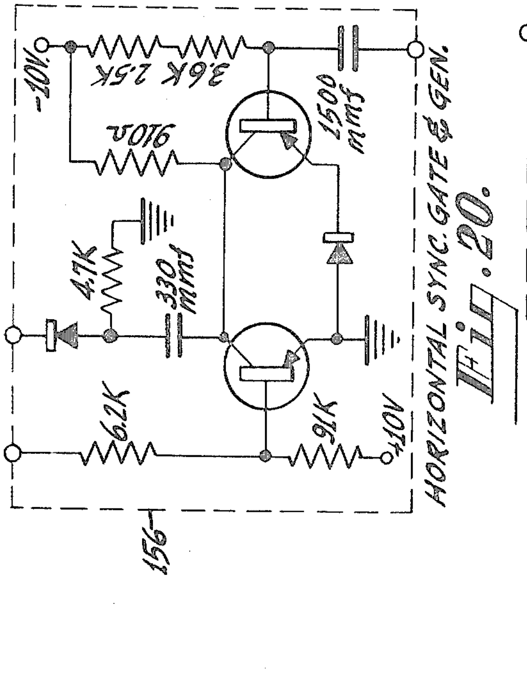
FIG. 20. HORIZONTAL SYNC. GATE & GEN.
Inventor:
LEONARD J. BAUN
BY Eugene M. Whitacre
Attorney Inventor:
LEONARD J. BAUN
BY Eugene M. Whitacre
Attorney Inventor:
LEONARD J. BAUN
By Eugene M. Whitacre
Attorney Inventor:
LEONARD J. BAUN
BY Eugene M. Whitacre
Attorney Inventor:
LEONARD J. BAUN
BY Eugene M. Whitacre
Attorney Inventor:
LEONARD J. BAUN BY Eugene M. Whitacre
Attorney Inventor:
LEONARD J. BAUN BY Eugene M. Whitacre
Attorney Inventor:
LEONARD J. BAUN By Eugene M. Whitacre
Attorney

TELEVISION BLANKING AND SYNCHRONIZING SIGNAL GENERATOR

In the processing of television signals, particularly at points in a network at which received signals are processed and relayed to a further point on the network, it frequently is necessary to recondition signals, particularly the blanking and sync signals which may have been distorted in transmission so that well-shaped and accurately timed blanking and sync signals may be added to the video signal for relaying purposes. It sometimes happens that the composite television signal is entirely lost in transmission for brief periods, or at least the sync signals may be so badly mutilated as to e unreliable for further transmission so that blanking and sync signal regenerator apparatus heretofore used has been incapable of operating satisfactorily.

It is, therefore, an object of the present invention to provide a blanking and sync signal generator for use in a composite video signal processor which is capable of regenerating the blanking and sync signals in a novel manner, and which is also capable of continuing its operation for periods in which the blanking and sync signals are either completely lost or are received in unusable form.

In the composite blanking signal generator embodying the present invention, a basic timing generator operating at twice the horizontal line repetition rate has one output which is compared with the incoming external sync signal in an AFC circuit, which applies a control signal to the timing unit representative of any detected difference in phase between the incoming sync and the output of the local timing unit. Other outputs of the local timing unit provide the necessary timing information either at horizontal line rate or at twice that rate. For horizontal blanking signals, alternate cycles of the timing unit output are eliminated so as to control a composite blanking generator to produce horizontal blanking signals at the line repetition rate and of the required width or time duration. Another output of the basic timing unit is employed to drive a line counter which initiates the development of a control signal for impression upon the composite composite blanking generator that is properly timed relative to the horizontal blanking signals. Such control signal also has the required width or time duration of the desired vertical blanking interval occurring between successive fields. The output of the composite blanking generator then is a proper combination of horizontal and vertical blanking signals which are suitable for combination with a video signal.

The composite sync signal generator includes apparatus by which to generate three sets of signals having respective widths or time durations corresponding to the required widths of horizontal and vertical sync signals. Gates for the equalizing pulse and vertical sync signal generator are switched into successive operation under the control of vertical timing information derived from the composite blanking signal generator. The timing of the composite sync generator is controlled by other timing information derived from the composite blanking generator and also by the outputs of the equalizing pulse, horizontal sync and vertical sync generators to produce a composite sync signal which meets the required United States standards promulgated by the Federal Communications Commission and is available for combination with the generated composite blanking signal and with the video signal.

The composite sync generator also is provided with an output which is connectable is a feedback loop by a mode switch which is responsive to a sync signal detector for properly timing the relationship between the horizontal and vertical blanking and sync signals in the event of a failure to receive a sync from an external source.

For a more detailed description of the apparatus embodying the present invention, reference may made to the following description, which is taken in connection with the accompanying drawings of which:

FIG. 3 is a block diagram of the components of the composite sync generator;

FIG. 20 is a schematic circuit diagram of a horizontal sync gate and generator of FIG. 3;

FIG. 21 is a schematic circuit diagram of a vertical sync generator of FIG. 3;

FIG. 22 is a schematic circuit diagram of the composite sync generator of FIG. 3;

FIG. 23 is a schematic circuit diagram of a No. 1 equalizing pulse gate generator of FIG. 3;

Figure 30:
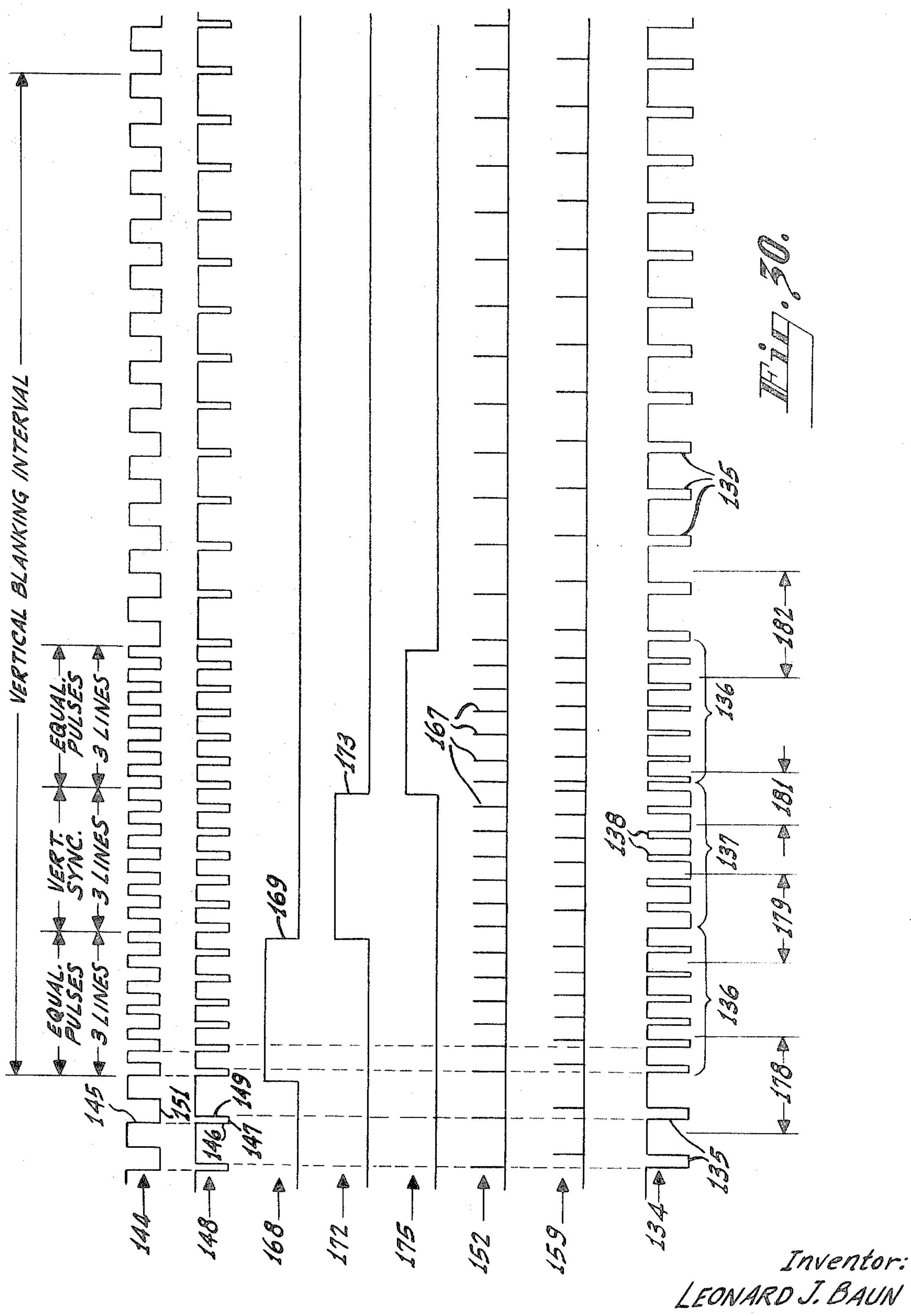

FIG. 30 includes wave forms to be referred to in connections with the operational description of the sync signal generator of FIG. 3; and FIGS. 31, 32, 33 and 34 are wave forms depicting expanded portions of the sync signal wave forms of FIG. 30.

The following description comprises six sections under the respective headings of:

1. GENERAL SYSTEM
2. HORIZONTAL BLANKING SIGNAL GENERATION
3. VERTICAL BLANKING SIGNAL GENERATION
4. COMPOSITE HORIZONTAL AND VERTICAL SYNC SIGNAL GENERATION
5. FREE-RUNNING MODE OF OPERATION
6. ADDITIONAL DATA

The descriptions of the apparatus embodying the invention given under headings 2, 3 and 4 are for a locked mode of operation.

Figure 1:
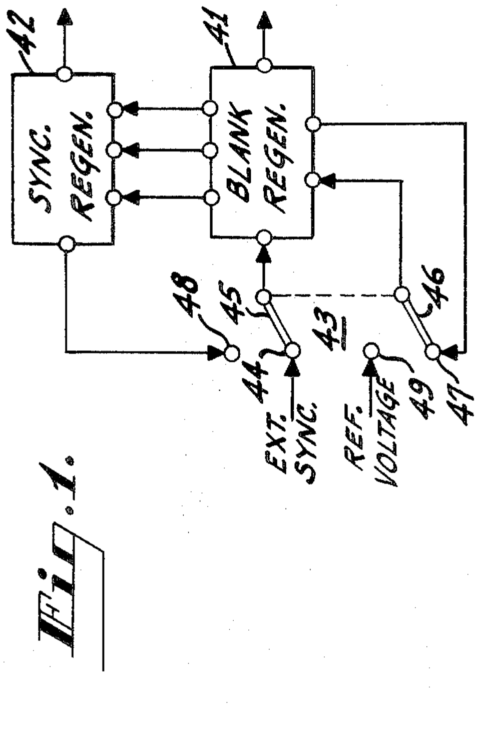
FIG. 1 is a block diagram of a complete system including both blanking and sync signal generators.

GENERAL SYSTEM in FIG. 1 there is shown the general system arrangement of the composite blanking generator 41, the composite sync generator 42 and the mode switch 43. It will be understood that the showing of the mode switch is merely diagrammatic and that in the system it is an electronic device. In the switch position shown, external blanking and sync information is applied at terminal 44 and is transferred by switch arm 45 to the blanking generator 41. Also, in the illustrated switch position the switch arm 46 and terminal 47 effectively complete an AFC loop for the blanking generator to effect its frequency control by the incoming sync signal. In the event that no sync signal is received at terminal 44, such condition is sensed and the switch is automatically moved effectively to its other position in which the switch arm 45 and terminal 48 closes a return loop from the sync generator 42 to the blanking generator 41 for sync signals developed by the former. Also, the switch arm 46 and terminal 49 apply a fixed reference voltage to the basic timing unit of the blanking generator 41 to arbitrarily control its frequency at a preset rate.

Figure 2:
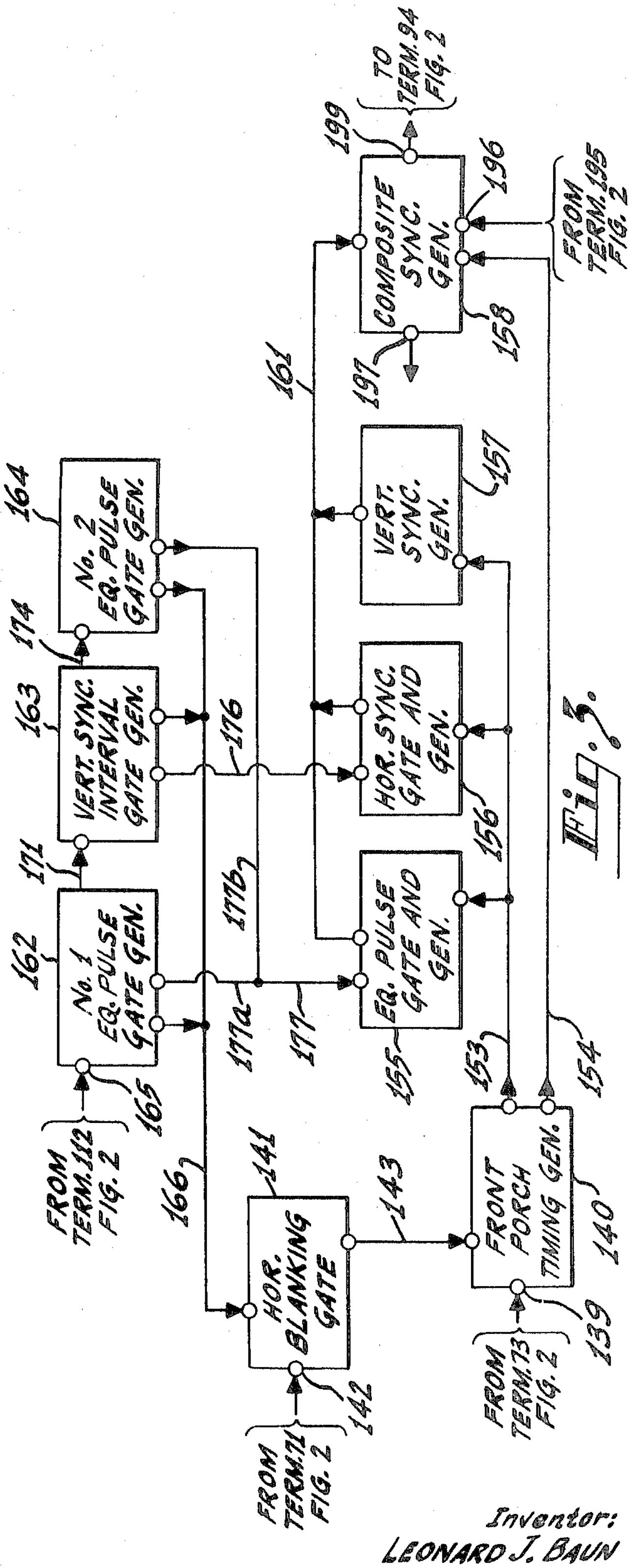
FIG. 2 is a block diagram of the components of the composite blanking generator.
Figure 2:
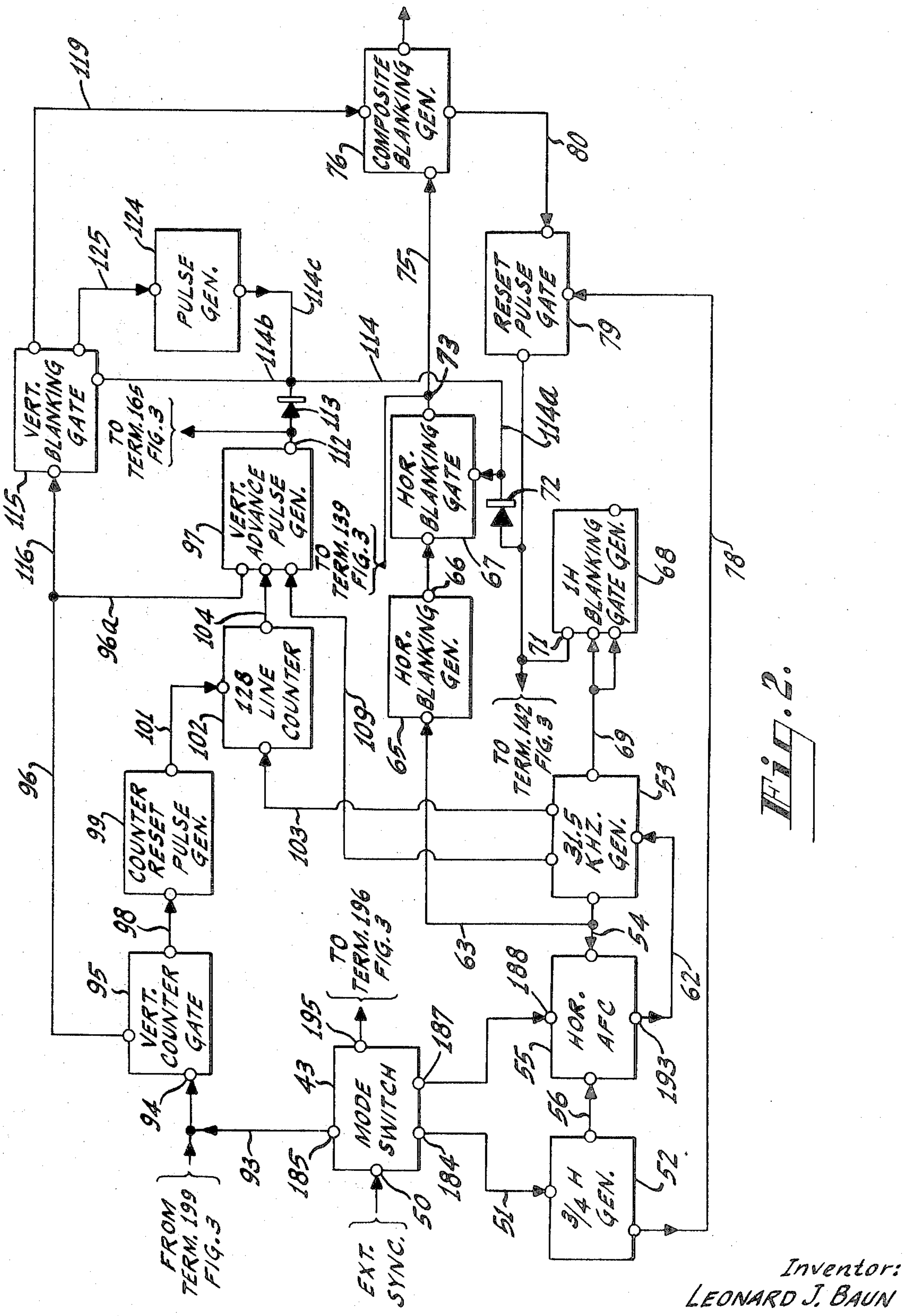

In order to facilitate an understanding of the operation of the apparatus embodying this invention without unduly complicating the drawings, the block diagrams of FIGS. 2 and 3 show various terminals at the sides of the blocks. In the schematic circuit diagrams of the apparatus represented by these blocks, the internal circuits are connected to terminals located generally in places corresponding to those indicated in the block diagrams. In a few instances such terminals are identified y reference characters in both the block and schematic diagrams.

HORIZONTAL BLANKING SIGNAL GENERATION

Figure 27:
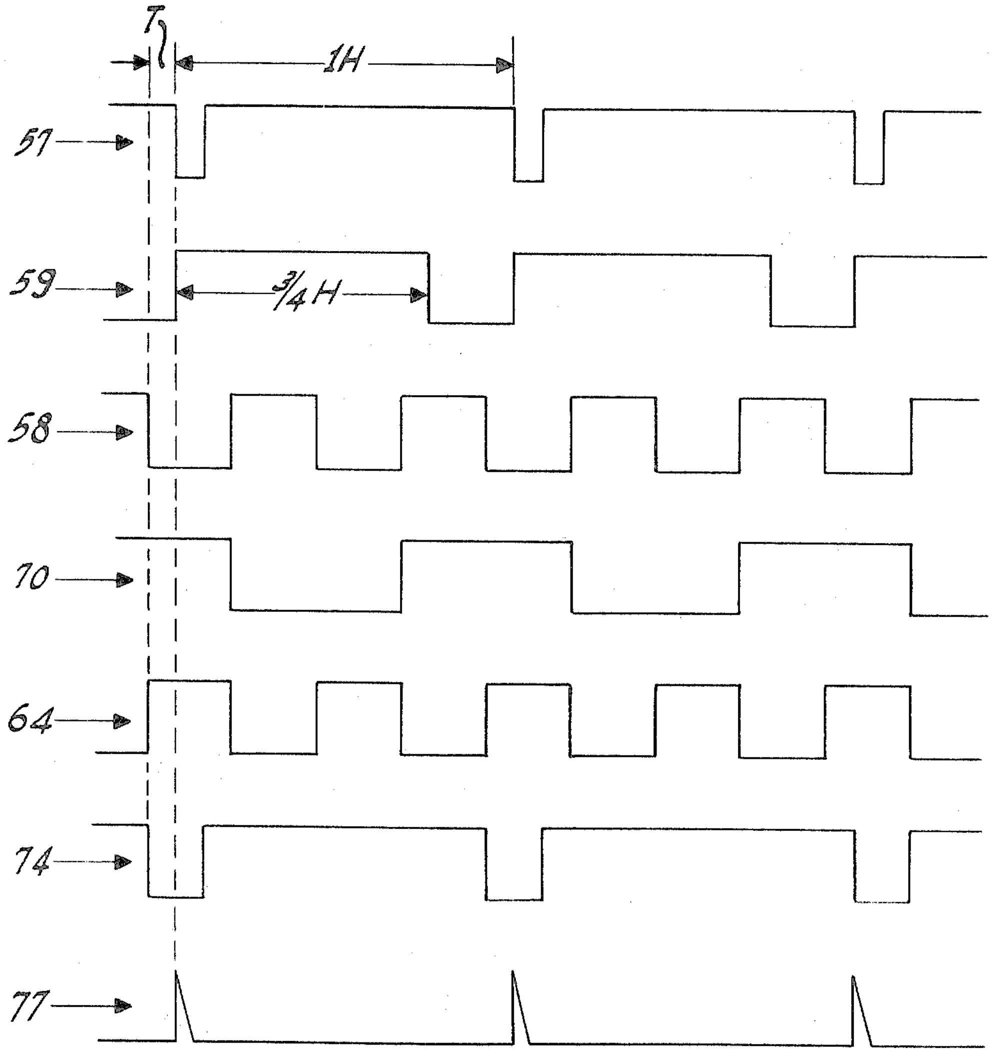
FIGS. 27, 28 and 29 are wave forms at various points of blanking generator of FIG. 2 included for the purpose of explaining the operation of the blanking generator.

In FIG. 2 the mode switch 43 receives external sync signals at an input terminal 50 and normally transfers them via a conductor 51 to a monostable ¾H generator 52. The blanking generator also includes a 31.5 kHz. generator 53 which is a multivibrator and serves as the basic timing unit for the blanking and sync generating apparatus of FIGS. 2 and 3. One output of the generator 53 is applied by a conductor 54 to a horizontal AFC circuit 55 where it is compared with the external sync signal, impressed thereon by means of a conductor 56 between the AFC circuit and the ¾H generator 52. The latter apparatus serves to eliminate alternate ones of the double line rate pulses present during the first nine-line portion of the vertical blanking g interval, thereby effecting at all times the impression upon the AFC circuit 55 only of pulses occurring at the line repetition rate. In FIG. 27 the wave 57 represents the input to the AFC circuit 55 from the ¾H generator 52 and the wave 58 represents the AFC input from the 31.5 kHz. generator 53. The ¾H generator 52 is operated by a pulse of the sync wave 57 to its unstable state in which it remains for approximately three-fourths of the normal 1H period of the wave 57 to produce a wave 59. Any double line rate pulse of the sync wave 57 would occur while the ¾H generator is in its unstable state and, hence, would not be transferred to the AFC apparatus 55. Any detected difference between the phase of the incoming sync signal and the output of the generator 53 develops a undirectional control voltage which is applied by a conductor 62 from the AFC circuit 55 to the generator 53 to bring its phase into proper relationship with the incoming sync signal. The AFC circuit is provided with an adjustable facility whereby the output wave 58 (FIG. 27) of the 31.5 kHz. generator 33 is phase locked to the incoming sync signal wave 57 in such a manner that a timing edge of the wave 58 precedes the sync signals of the wave 57 by a horizontal advance time T which is sufficient to properly time the start of the horizontal blanking intervals.

By means of a conductor 63 the double line rate output from the generator 53 and represented by wave 64 of FIG. 27 is impressed upon a horizontal blanking generator 65, the output terminal 66 of which is connected as indicated, to the sync generator apparatus of FIG. 3 at which these double line rate pulses are required. The generator 65 includes a facility for making the output pulses at its terminal 66 with time durations equal to the desired horizontal blanking interval. However, for the purpose of developing horizontal rate blanking signals, a wave of only half the frequency of that of the wave 64 of FIG. 27 is required. This frequency conversion is accomplished by a horizontal blanking gate 67 upon which the double rate pulses present at terminal 66 of the horizontal blanking generator 65 are impressed. Except for the vertical blanking interval (to be subsequently described), the gate 67 is controlled by a 1H blanking gate generator 68 which is a bistable circuit receiving the double line rate wave 58 of FIG. 27 from the 31.5 kHz. generator 53 by way of a conductor 69. The normal output (represented by a wave 70 of FIG. 27) of the 1H blanking gate generator 68 developed at its output terminal 71 is impressed by means including a diode 72 upon the control circuit of the horizontal blanking gate 67 through a reset pulse gate 73. As a result, the output at terminal 73, for horizontal blanking purposes, from the combination of the horizontal blanking generator 65 and the horizontal blanking gate 67 has the form of a wave 74 of FIG. 27 and is applied by a conductor 75 to composite blanking generator 76.

In order that the gate pulse from the 1H blanking gate generator 68, represented by the wave 71 of FIG. 27, function to properly control the horizontal blanking gate 67, it must be properly phased relative to the sync pulses of the wave 57 so that it will allow only those pulses of the wave 64 to produce pulses of the wave 74 which are in phase with the incoming sync pulses for application to the composite blanking generator 76. To insure this result, a reset pulse, illustrated by the wave 77 of FIG. 27, is generated by the ¾H generator 52. This reset pulse is timed with the leading edge of the incoming sync pulse represented by the wave 57 of FIG. 27 and is applied by a conductor 78 to the reset pulse gate 79. This gate is effectively opened and closed by the composite blanking signal derived from the output of the composite blanking generator 76 and which is applied by a conductor 80 to the pulse gate 79. As long as the correct phase of the generated blanking pulse relative to the incoming sync signal is maintained, the reset pulse gate 79 will not transmit the reset pulse from the ¾H generator 52. In the event that an out-of-phase condition exists, the reset pulse will be transmitted to the 1H blanking gate generator bistable circuit to switch it to the correct state.

VERTICAL BLANKING SIGNAL GENERATION

Figure 28:
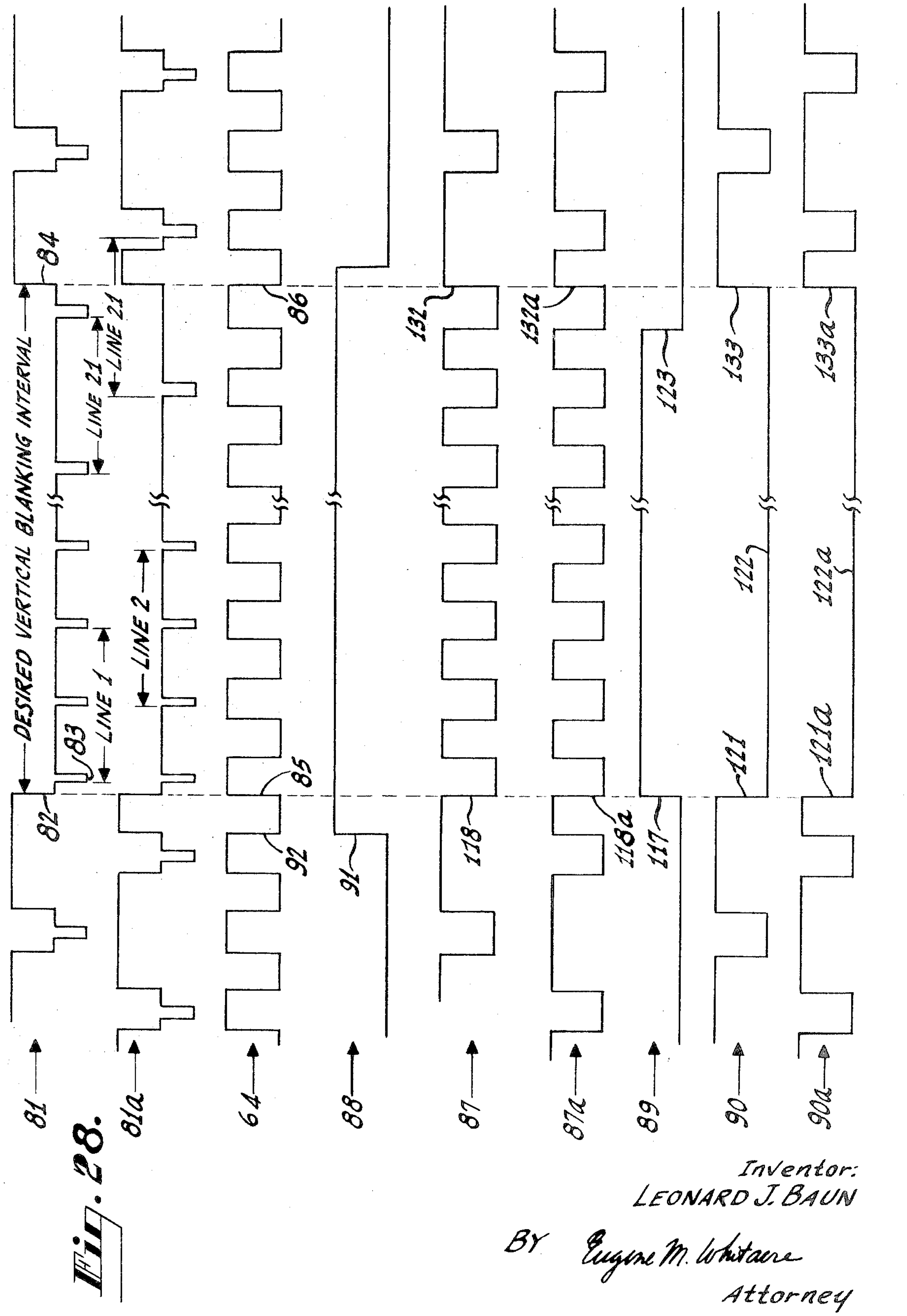

The apparatus of FIG. 2 used in generating the vertical blanking signals will be described in conjunction with FIGS. 28 and 29. The waves 81 and 81*a* of FIG. 28 represent the composite blanking and sync signals for the odd and even line fields respectively. In each filed the required start time of the vertical blanking interval corresponds precisely with the back porch time 84 following the 21st line of the interval. As will be demonstrated, the start and finish times of the vertical blanking interval may be precisely controlled by using timing edges of waves produced by the horizontal blanking generator.

In FIG. 28 the wave 64 of FIG. 27 is reproduced as it is derived from the 31.5 kHz. generator 53 of FIG. 2. It is seen that this wave has one timing edge 85 occurring precisely at the start and another timing edge 86 occurring precisely at the finish of the desired vertical blanking interval in both fields. The edge 85 is used to produce a leading edge trigger for the composite blanking generator 76 to define the vertical blanking interval. This is accomplished, in part, by disabling the horizontal blanking gate 67 during most of the desired vertical blanking interval so that the output at terminal 73 is represented by the waves 87 and 87*a* respectively in the even and odd line fields. The horizontal blanking gate is effectively disabled during the vertical blanking interval by means of a gating pulse wave 88, the production of which will be described presently. It will be noted that this pulse starts at a time just preceding the start, and ends just after the finish, of the desired vertical blanking interval and embraces the timing edges 85 and 86 of the wave 64.

In order to utilize the two timing edges 85 and 86 of the pulse wave 64 another gating pulse wave 89 is employed. It will be noted that this pulse starts at a time slightly later than the start, and ends just before the finish, of the desired vertical blanking interval. This pulse is applied to the composite blanking generator 76 in a manner to be subsequently described to so control the bistable generator 76 as to produce the desired composite blanking waves 90 and 90*a* for the even and odd line fields respectively.

The production and use of the gating pulse waves 88 and 89 of FIG. 28 will now be described with reference to the apparatus of FIG. 2. The timing of the leading edge 91 of the pulse wave 88 is important because it must effectively predict the start of the vertical blanking period. This edge has a timing tolerance of approximately 15 to 20 microseconds and includes a timing edge 92 of the 31.5 kHz. wave 64 which marks the correct start time of the gating pulse wave 88 in advance of the start of the desired vertical blanking interval. It is the timing edge 92 which must be preserved for operation of the vertical blanking system in proper phase or time relationship to the horizontal blanking system. This is accomplished in the following manner.

In FIG. 2, incoming vertical sync signals derived from the mode switch 43 are impressed by a conductor 93 upon an input terminal 94 of a vertical counter gate 95 which is a monostable device. A vertical sync signal switches the gate 95 to its unstable state in which it remains for somewhat longer than one-half of a field period. By means of conductors 96 and 96*a* a steady output voltage from the counter gate 95 is impressed upon a bistable vertical advance pulse generator 97 to render it inactive for the duration of the unstable state of the vertical counter gate 95. By means of a conductor 98 another output voltage from the counter gate 95 is impressed upon a counter reset pulse generator 99 which develops a pulse that is impressed by a conductor 101 upon a 128 line counter 102. The counter comprises eight binary counters driven through a conductor 103 by an output from the 31.5 kHz. generator 53 corresponding to the wave 58 of FIG. 27. At the end of each 128 line count a leading edge trigger is impressed by a conductor 104 upon the vertical advance pulse generator 97. Because the vertical advance pulse generator 97 is held inactive under the described control of the vertical counter gate 95 for more than one-half of a field period, the first leading edge trigger from the 128 line counter, which occurs approximately at midfield time after the counter reset, is ineffective to produce response by the vertical advance pulse generator. The purpose of the reset pulse is to place the 128 line counter 102 in such a state that, at the end of two successive 128 line counts, the timing edge 92 of the wave 64 of FIG. 28 is preserved for both even and odd line fields. This, in effect, properly phases the vertical blanking system to the vertical input sync information.

By the time that the 128 line counter 102 reaches the end of its second complete count after reset the vertical count gate 95 will have returned to its stable state, thereby enabling the vertical advance pulse generator 97 for response to a leading edge trigger from the counter 102. In FIG. 29 this trigger edge 105 of the wave 106, representing the output from the counter 102, operates the vertical advance pulse generator 97 to produce the leading edge 107 of a vertical advance pulse 108. The impression, by means of a conductor 109, of the next succeeding trigger edge 110 of the wave 64 from the 31.5 kHz. generator 53 upon the vertical advance pulse generator 97 returns the pulse generator to its initial state, thereby forming the trailing edge 111 of the vertical advance pulse 108. This trailing edge 111, thus, provides a stable time reference because it is produced by a wave from the basic timing unit of the system, viz., the 31.5 kHz. generator 53.

Figure 29:
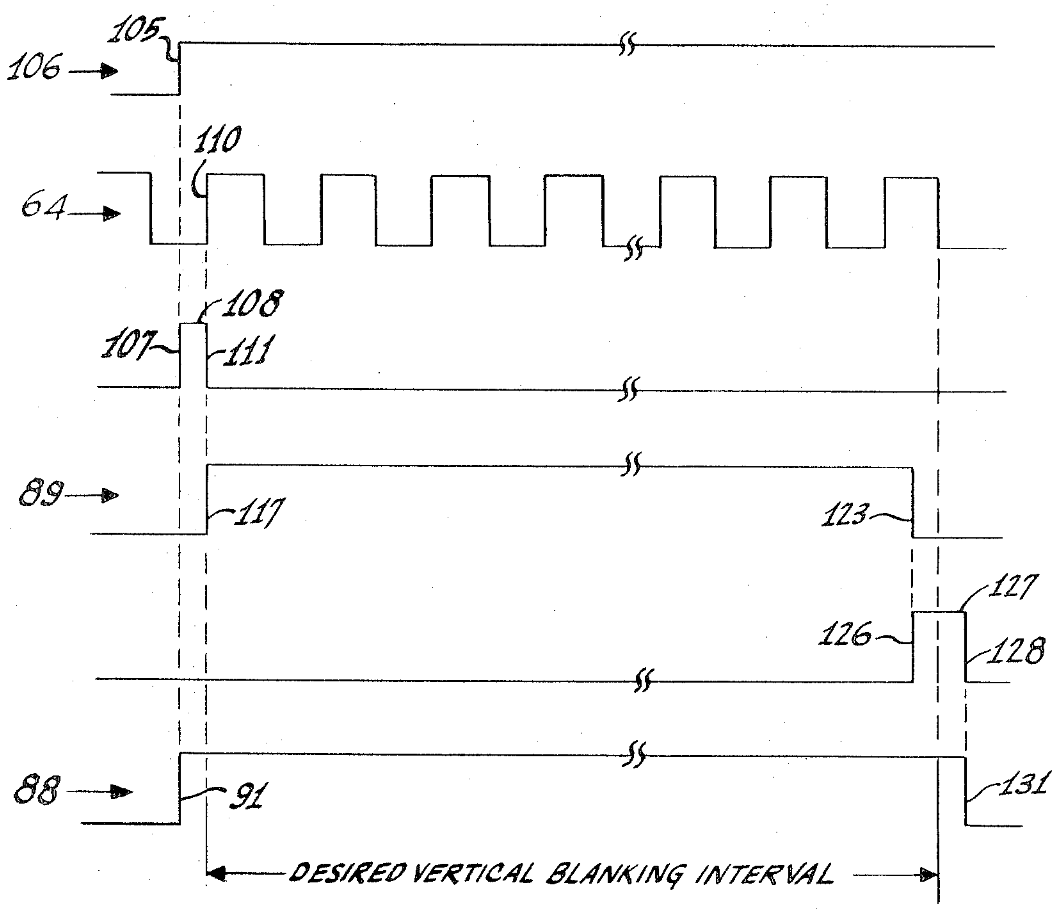

The vertical advance pulse 108 of FIG. 29, developed at the output terminal 112 of the pulse generator 97 of FIG. 2 is impressed, by means including a diode 113 and conductors 114 and 114*a* upon the horizontal blanking gate 67 of FIG. 2 to disable it and thereby allow the 31.5 kHz. wave 64 of FIGS. 27 and 28 to be impressed upon the composite blanking generator 76. The vertical advance pulse 108 of FIG. 29 also is impressed upon a vertical blanking gate 115 by means of conductors 96 and 116, whereby the trailing edge 111 of the pulse operates this monostable circuit to its unstable state, thereby producing the leading edge 117 of the gating pulse wave 89 of FIGS. 28 and 29. The gating pulse 89 has a width or time duration determined by the time constants of the gate 115 and is impressed, by conductors 114*b*, 114, and 114*a* upon the horizontal blanking gate 67 of FIG. 2, thereby continuing its disablement. The gating pulse wave 89 also is impressed, by a conductor 119, upon the composite blanking generator 76 so as to render it unresponsive to trailing edge triggers of the 31.5 kHz. wave 64 from the horizontal blanking generator 65. As may be seen in FIG. 28, the last leading edge triggers 118 and 118*a* of the waves 87 and 87*a* preceding the leading edge 117 of the gating pulse 89 operate the composite blanking generator 76 in a manner to produce the leading edges 121 and 121*a* of the vertical blanking pulses 122 and 122*a* in the even and odd line fields respectively. The composite blanking generator 76 remains in this state for the duration of the gating pulse 89.

The trailing edge 123 of the gating pulse 89 is produced by the return of the monostable vertical blanking gate 115 to its stable state. The removal of the gating pulse 89 from the composite blanking generator 76 enables the generator for response to the next succeeding trailing edge trigger from the horizontal blanking generator 65. The trailing edge 123 of the gating pulse 89 also is impressed upon a pulse generator 124 by means of a conductor 125, thereby producing the leading edge 126 of a pulse 127 of FIG. 29. This pulse is impressed by conductors 114*c*, 114 and 114*a* upon the horizontal blanking gate 67, thereby further continuing its disablement until the trailing edge 128 of the pulse 127 is produced by the time constants of the pulse generator 124. It will be noted from the foregoing description and from FIG. 29 that the gating pulse wave 88 effectively comprises the continuous series of pulses 108, 89 and 127 applied to the horizontal blanking gate 67, the leading edge 107 of the vertical advance pulse constituting the leading edge 91, and the trailing edge 128 of the pulse 127 constituting the trailing edge 131, of the pulse wave 88.

The gating pulse wave 88 is effective to continue the disablement of the horizontal blanking gate 67 for a sufficient time after the termination of the gating pulse 89 to enable either the trailing edge trigger 132 or 132*a* of waves 87 and 87*a* respectively to effect a change of state of the composite blanking generator 76, thereby producing the trailing edges 133 and 133*a* of the vertical blanking pulses 122 and 122*a* in the respective even and odd line fields. After the termination of the gating pulse 88, the horizontal blanking generator 65, the horizontal blanking gate 67 and the composite blanking generator 76 resume their operation as previously described to produce horizontal blanking pulses as shown by waves 90 and 90*a* of FIG. 28 until the next vertical blanking interval.

COMPOSITE HORIZONTAL AND VERTICAL SYNC SIGNAL GENERATION

The composite sync signal generating apparatus of FIG. 3 functions in a manner to be described to produce a standard composite sync signal 134 of FIG. 30. Such a signal includes horizontal sync signals 135 and 135*a* occurring at the line repetition rate during field scanning intervals and also during all but the first nine-line period of the vertical blanking intervals. The signal also includes equalizing pulses 136 and 136*a* occurring at double the line repetition rate during the first and third three-line portions of the vertical blanking intervals. During the second three-line portion of the vertical blanking intervals the sync signal includes the vertical sync pulse 137 which has serrations 138 occurring at double the line repetition rate.

The waves 87 and 87*a* of FIG. 28, which are derived from the output terminal 73 of the horizontal blanking gate 67 of FIG. 2, are impressed upon the input terminal 139 of a front porch timing generator 140 of FIG. 3 for use as the basic timing reference for the sync generator. The waves 87 and 87*a* are used for this purpose because double line rate information is required during the first nine-line portion of the vertical blanking interval. For the remaining 12-line portion of the vertical blanking interval, however, single line rate information is required. Hence, a horizontal blanking gate 141, actuated by the wave 70 of FIG. 27 derived from the output terminal 71 of the 1H blanking gate generator 68 of FIG. 2 and impressed upon its input terminal 142, so modifies the waves 87 and 87*a* present at the input terminal 139 of the front porch timing generator 140 by means including a conductor 143 that the generator is actuated by the wave 144 of FIG. 30. As will be subsequently described, the horizontal blanking gate is inhibited from performing such a control function during the first nine-line portion of the vertical blanking interval.

The front porch timing generator 140 is a box car circuit which, in response to the leading edge 145 of a pulse of the wave 144 of FIG. 30, is operated to its unstable state to produce the leading edge 146 of a pulse 147 of a wave 148. The generator 140 returns to its stable state at a time determined by its time constants to produce the trailing edge 149 of the pulse 147 so that its width is equal to the width of the front porch of the horizontal blanking period which begins with the leading edge 145 of a horizontal blanking pulse 151 of the wave 144 of FIG. 30.

The trailing edges of the pulses of the wave 148 produce a train of leading edge triggers 152 which are impressed by conductors 153 and 154 upon an equalizing pulse gate and generator 155, a horizontal sync gate and generator 156, a vertical sync generator 157 and a composite sync generator 158, respectively. The composite sync generator 158 is a bistable device, the generators 155 and 156 are boxcar circuits and the generator 157 is a monostable device respectively operative, when activated, to produce different width pulses, the trailing edges of which produce a train of trailing edge triggers 159 of FIG. 30 which are impressed by means including a conductor 161 upon the composite sync generator 158 of FIG. 3.

The pulse and sync generators 155, 156 and 157 are activated at appropriate times under the control of a No. 1 equalizing pulse gate generator 162, a vertical sync interval gate generator 163 and a No. 2 equalizing pulse gate generator 164. The gate generators 162, 163 and 164 are controlled by the vertical advance pulse 108 of FIG. 29 derived from the output terminal 112 of the vertical advance pulse generator 97 of FIG. 2 and impressed upon the input terminal 165 of the No. 1 equalizing pulse gate 162. During the first nine-line portion of the vertical blanking interval one after the other of the gate generators 162, 163 and 164 impresses an inhibiting pulse upon the horizontal blanking gate 141 by means including a conductor 166 so as to allow the double line rate pulses of wave 64 of FIG. 27 to effect the production by the front porch timing generator 140 of double line rate leading edge triggers 167.

Each of the gate generators 162, 163 and 164 is a monostable device, the time constants of which are adjusted to maintain it in its unstable state after triggering for a three-line period. The No. 1 equalizing pulse gate generator 162 is triggered just prior to the start of a vertical blanking interval by the vertical advance pulse 108 of FIG. 29 to produce a first equalizing pulse gate signal 168 in its output wave 168*a*. The trailing edge 169 of the gate signal 168 produces an actuating trigger which is impressed by means including a conductor 171 upon the vertical sync gate signal 172 in the output wave 172*a* of the generator 163. The trailing edge 173 of the gate signal 172 produces an actuating trigger which is impressed by means including a conductor 174 upon the No. 2 equalizing pulse gate generator 164 to produce a second equalizing pulse gate signal 175 in the output wave 175*a* of the generator 164.

To understand the manner in which the gate signal generators 162, 163 and 164 control the pulse generators 155, 156 and 157 it should be borne in mind that all of the pulse generators are actuated concurrently into their respective unstable states by leading edge triggers such as 152 and 167 of FIG. 30 received from the front porch timing generator 141. Also, because of the different widths of the pulses to be generator during the vertical blanking interval, the generators 155, 156 and 157 return to their respective stable states to produce trailing edge triggers in the following order: first, the equalizing pulse generator 155; second, the horizontal sync generator 156; and third, the vertical sync generator 157. It further should be recognized that the composite sync generator 158 responds to the first trailing edge trigger received after a leading edge trigger and is unresponsive to any trailing edge trigger received after the first. Hence, because the vertical sync generator 157 is the slowest to produce trailing edge triggers, it is allowed to operate continuously. Likewise, because the horizontal sync generator 156 is the second slowest to produce trailing edge triggers, it is allowed to operate substantially continuously, being disabled only during the three-line vertical sync period under the control of the gate signal 172 of FIG. 30 impressed upon it from the vertical sync interval gate generator 163 by means including a conductor 176. The equalizing pulse gate and generator 155 is actuated to produce trailing edge triggers during the first three-line period under the control of the gate signal 168 of FIG. 30 by means including conductors 177 and 177*a* and again during the third three-line period under the control of the gate signal 175 of FIG. 30 by means including conductors 177 and 177*b*.

Figure 32:
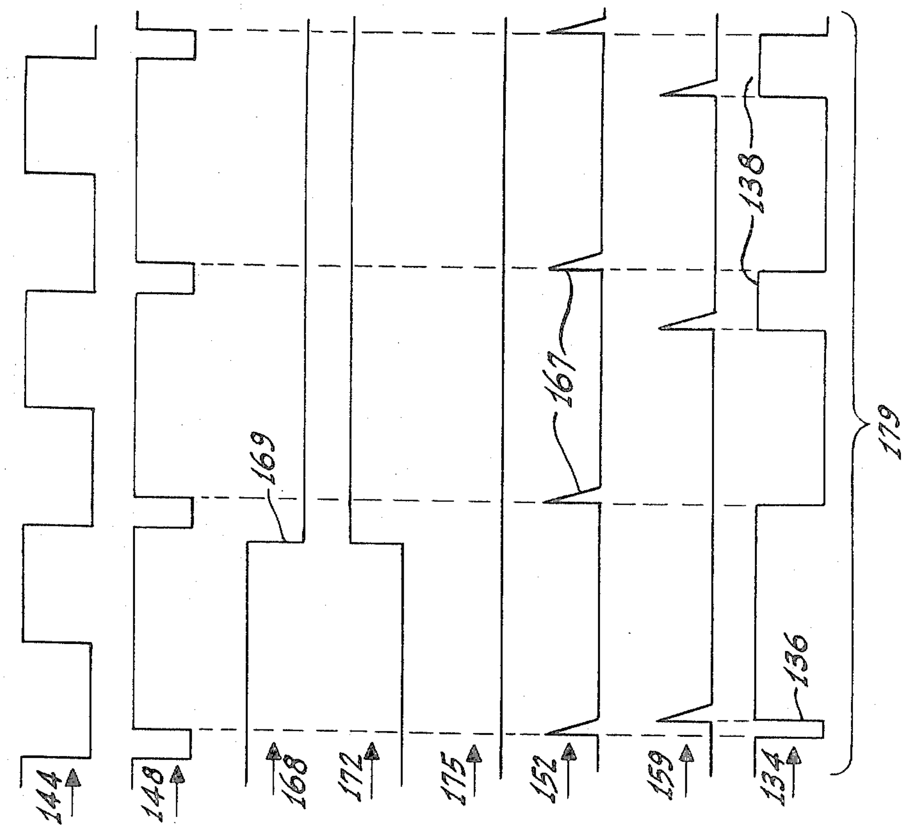
Figure 31:
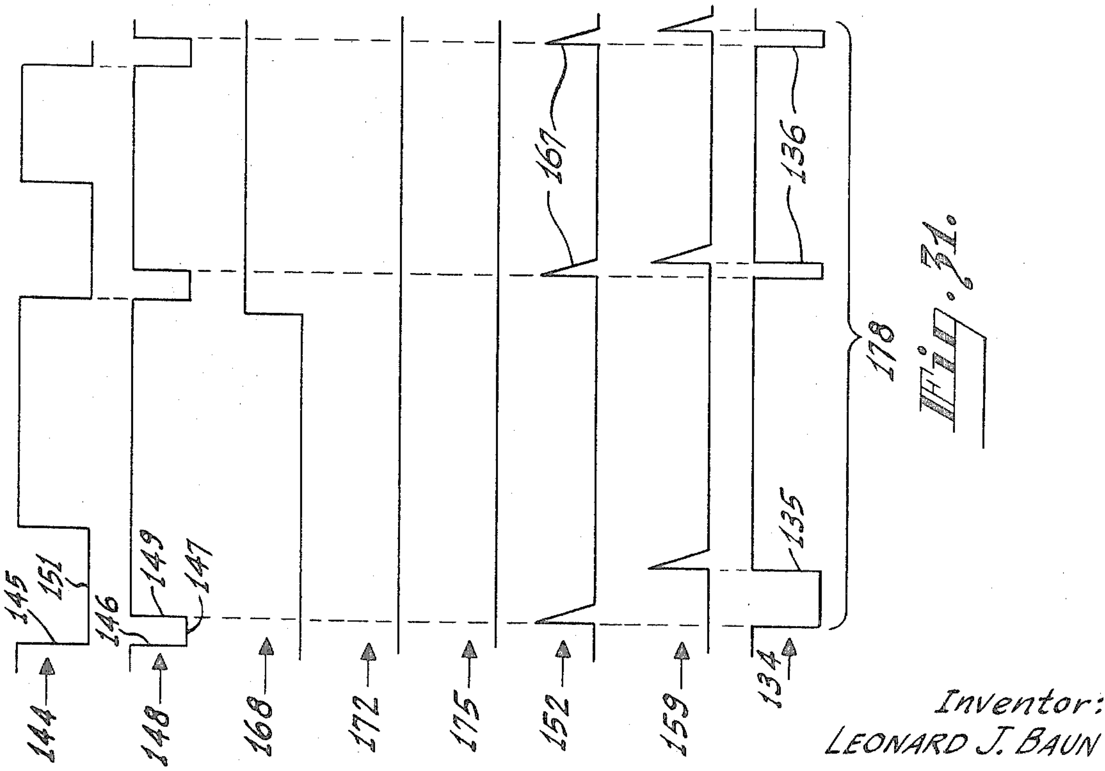
Figure 34:
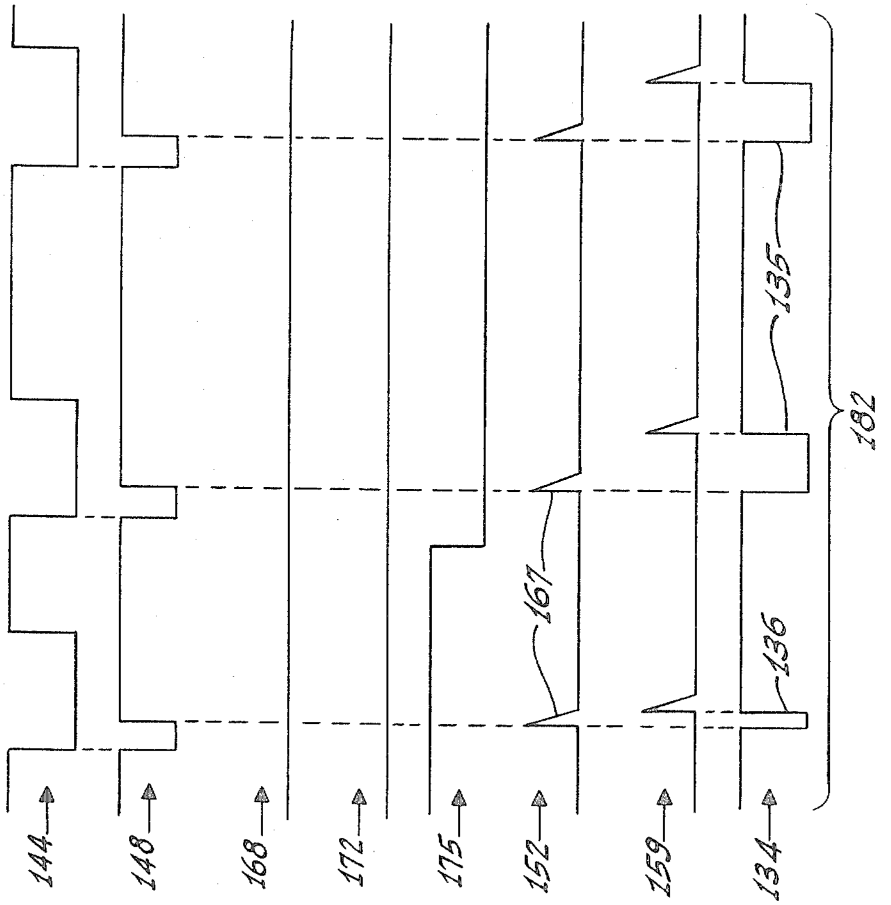
Figure 33:
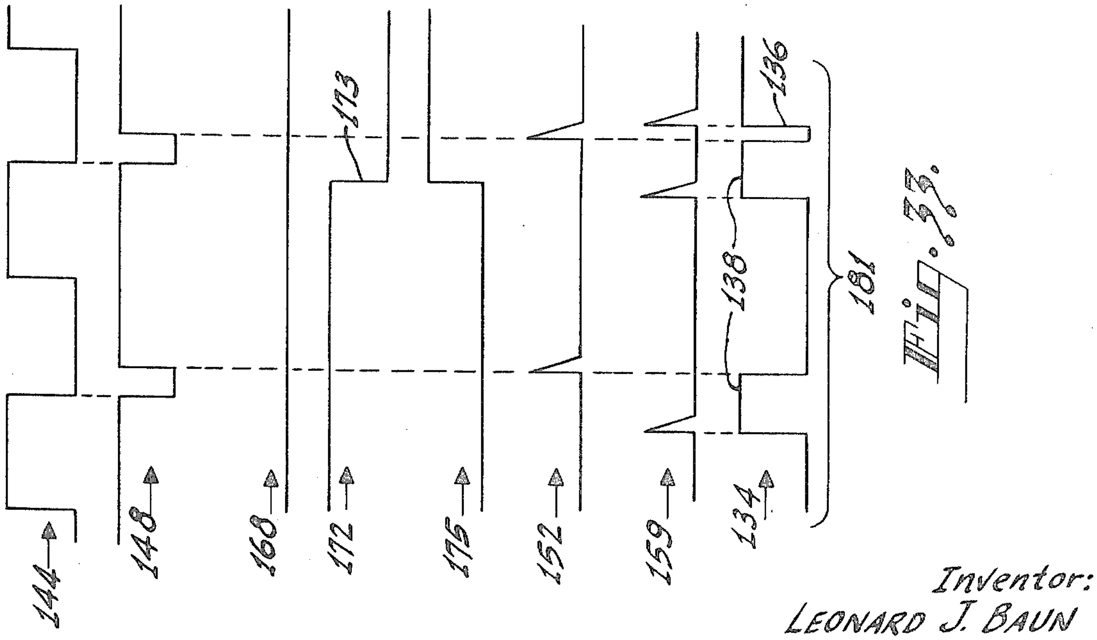

FIGS. 31, 32, 33 and 34 illustrate on an expanded scale the timing relationship between different components of the composite sync signal wave 134 produced in the output of the composite sync generator 158 of FIG. 3 and the control waves and pulses of FIG. 30. FIG. 31 represents the transition period 178 of FIG. 30 from the last of a series of horizontal sync signals 135 to the beginning of the first series of equalizing pulses 136. FIG. 32 represents the transition period 179 of FIG. 30 from the end of the first series of equalizing pulses 136 to the beginning of the vertical sync pulse 137 including some of the serrations 138 thereof. FIG. 33 represents the transition period 181 of FIG. 30 from the end of the vertical sync pulse 137 to the beginning of the second series of equalizing pulses 136*a*. FIG. 34 represents the transition period 182 of FIG. 30 from the end of the second series of equalizing pulses 136*a* to the beginning of the next series of horizontal sync signals 135*a* which continue for the remainder of the vertical blanking interval and through out the next field of the picture period.

FREE RUNNING MODE OF OPERATION

In the foregoing description of the blanking and sync signal generators of FIGS. 2 and 3 the mode switch 43 of FIG. 2 was assumed to be functioning in response to a received sync signal. By reference now to FIG. 4 the manner in which the mode switch 43 controls the generators will be described. When incoming sync signals are present at the input terminal 50 of the switch, they are transferred by an isolating amplifier transistor 183 to an output terminal 184 from which they are conveyed as previously described to the ¾H generator 52 by the conductor 51 of FIG. 2. The amplifier transistor also transfers the incoming sync signals to a second output terminal 185 from which they are conveyed by the conductor 93 to the input terminal 94 of the vertical counter gate 95 as described.

Figure 6:
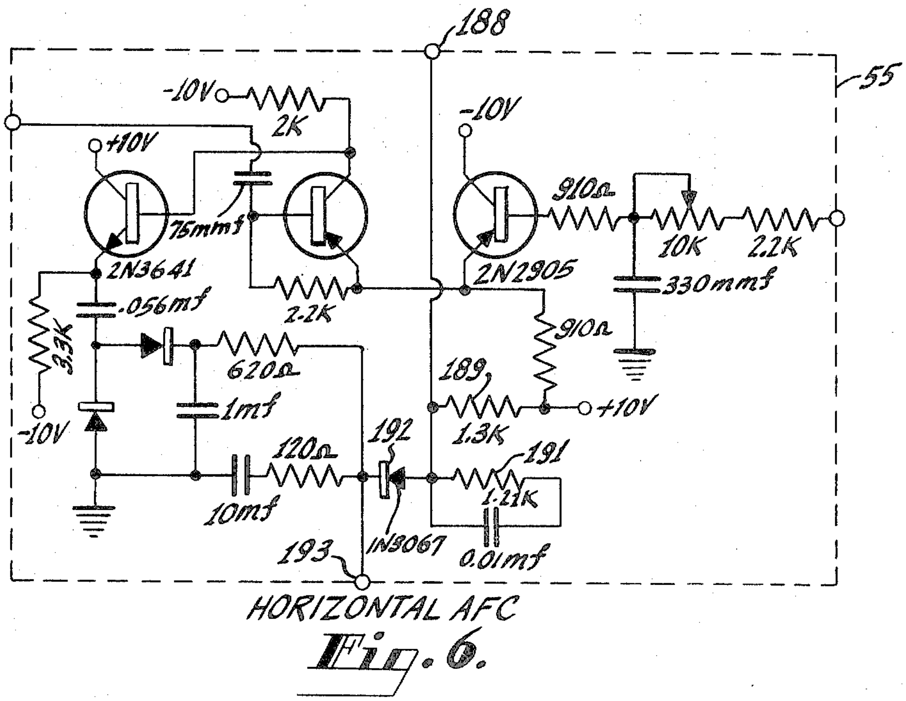
FIG. 6 is a schematic circuit diagram of a horizontal AFC circuit of FIG. 2.
Figure 7:
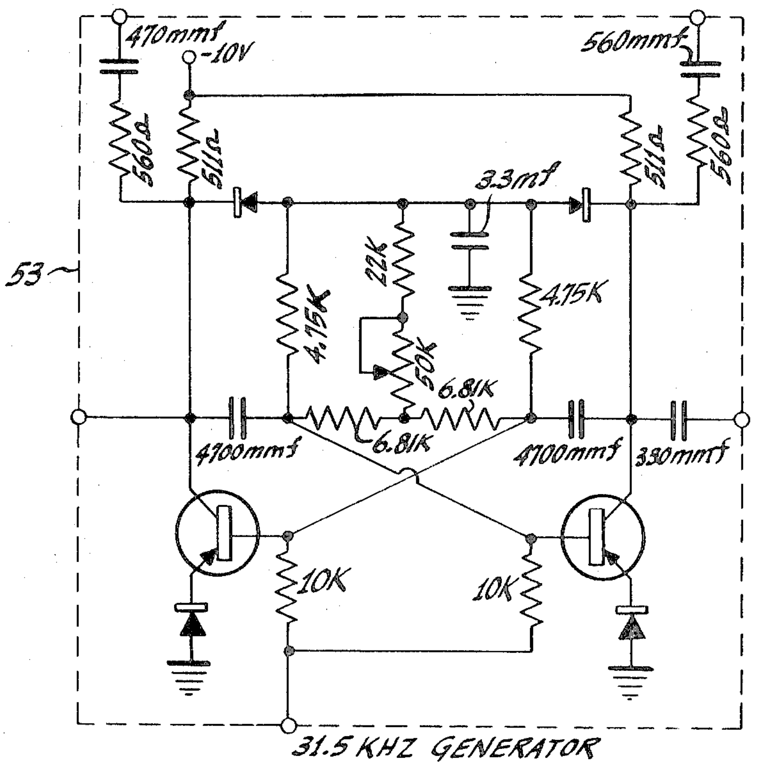
FIG. 7 is a schematic circuit diagram of a 31.5 kHz. generator of FIG. 2.
Figure 8:
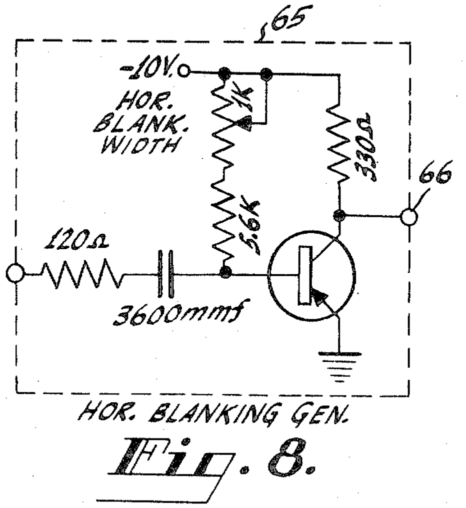
FIG. 8 is a schematic circuit diagram of a horizontal blanking generator of FIG. 2.
Figure 9:
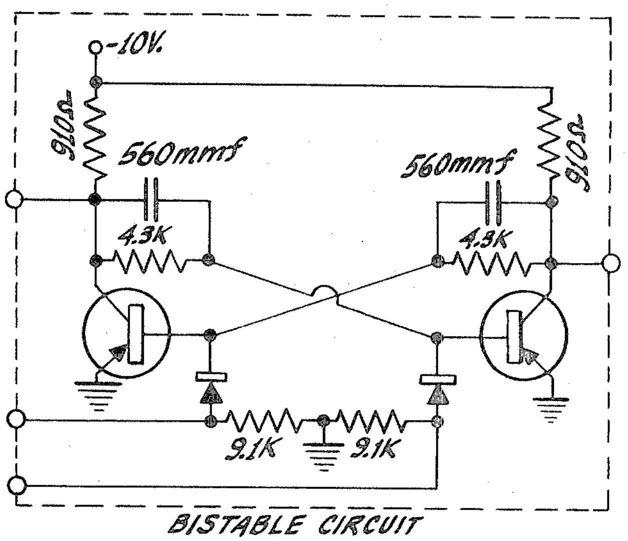
FIG. 9 is a schematic circuit diagram of a basic bistable circuit which is used in a number of the components of the blanking generator of FIG. 2 such as in a 1H blanking gate, a vertical advance pulse generator and a line counter.
Figure 10:
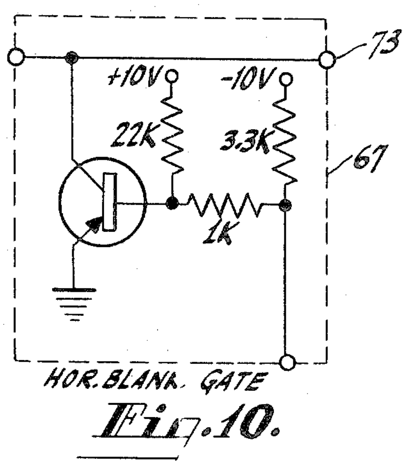
FIG. 10 is FIG. schematic circuit diagram of a horizontal blanking gate of FIG. 2.
Figure 11:
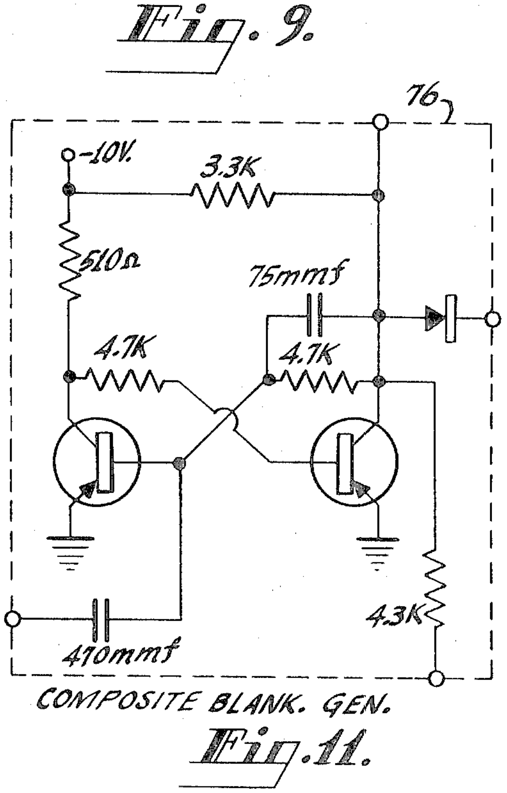
FIG. 11 is a schematic circuit diagram of a composite blanking generator of FIG. 2.
Figure 12:
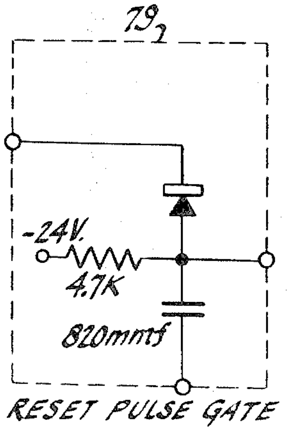
FIG. 12 is a schematic circuit diagram of a reset pulse gate of FIG. 2.
Figures 13, 14, 15:
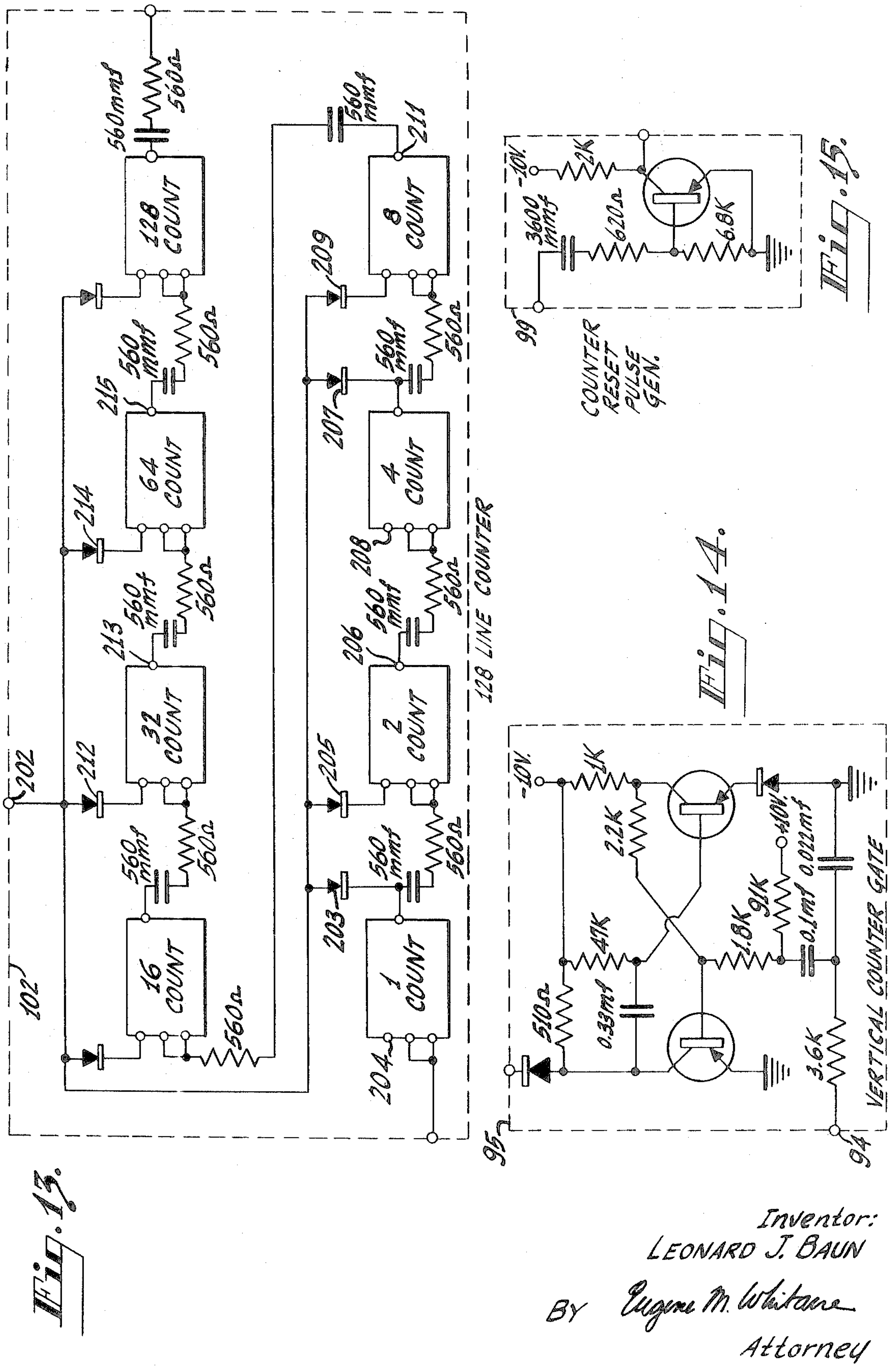
FIG. 13 is a partial schematic circuit and block diagram of a 128 line counter of FIG. 2 and comprises eight of the basic bistable circuits of FIG. 9.
FIG. 14 is a schematic circuit diagram of a vertical counter gate of FIG. 2.
FIG. 15 is a schematic circuit diagram of a counter reset pulse generator of FIG. 2.
Figure 18:
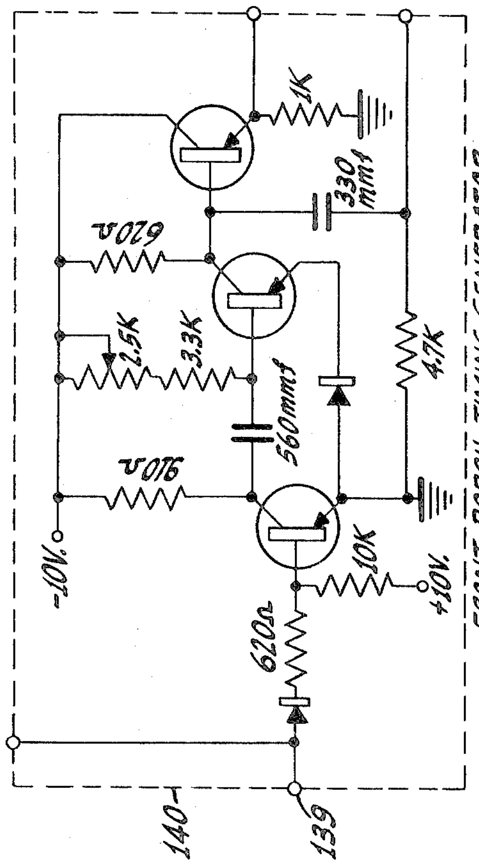
FIG. 18 is a schematic circuit diagram of a front porch timing generator of FIG. 3.
Figure 19:
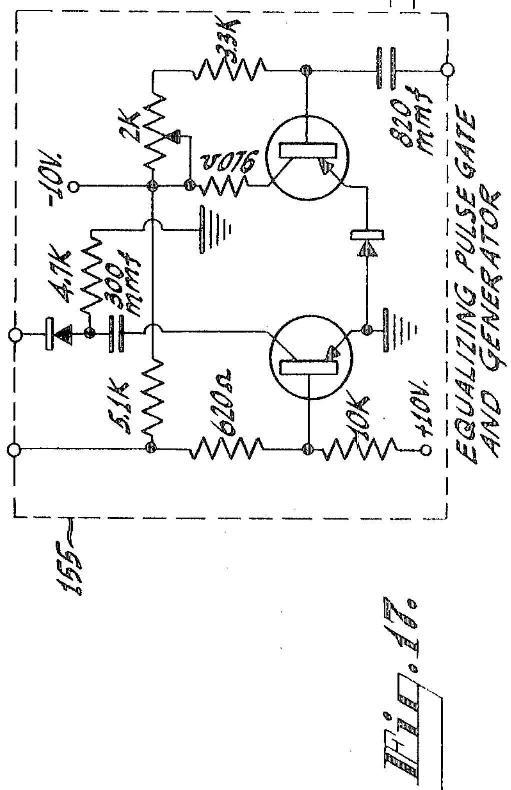
FIG. 19 is a schematic circuit diagram of an equalizing pulse gate and generator of FIG. 3.
Figure 16:
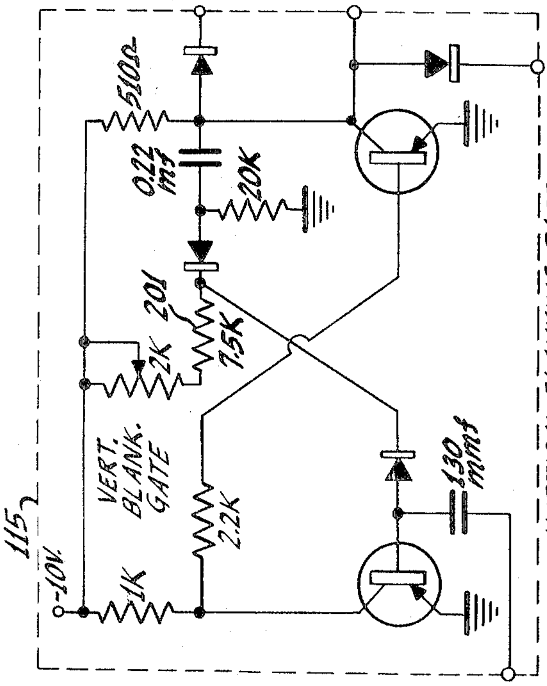
FIG. 16 is a schematic circuit diagram of a vertical blanking gate of FIG. 2.
Figure 17:
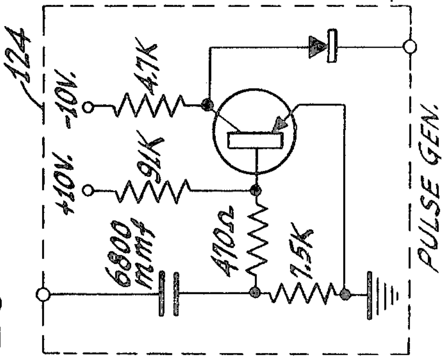
FIG. 17 is a schematic circuit diagram of a pulse generator of FIG. 2.
Figure 25:
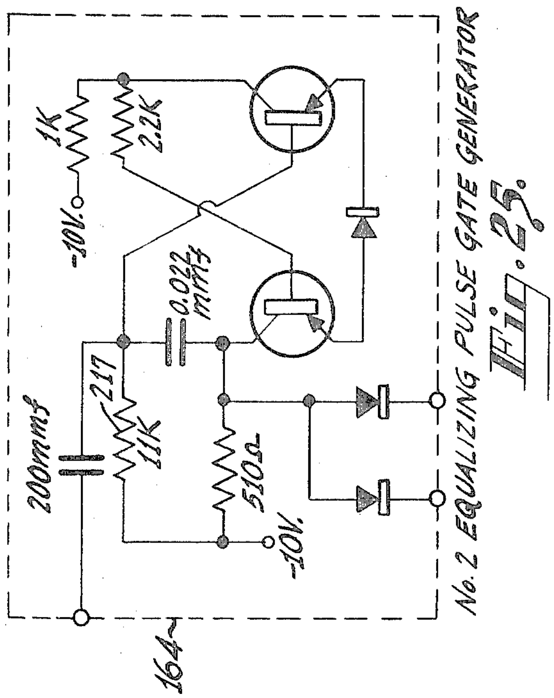
FIG. 25 is a schematic circuit diagram of a No. 2 equalizing pulse gate generator of FIG. 3.
Figure 24:
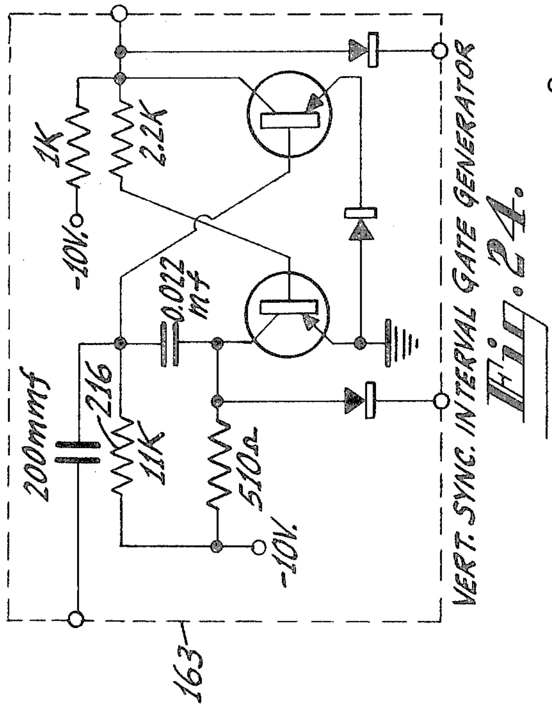
FIG. 24 is a schematic circuit diagram of a vertical sync interval gate generator of FIG. 3.
Figure 26:
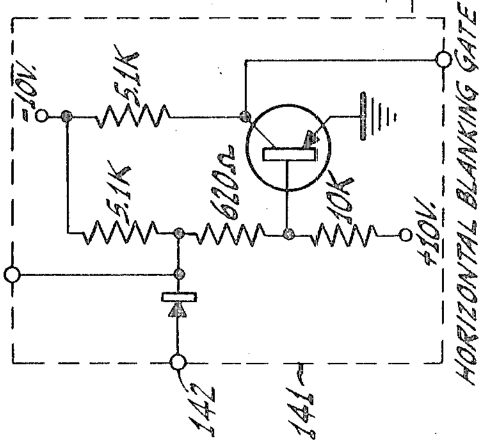
FIG. 26 is a schematic circuit diagram of a horizontal blanking gate of FIG. 3.

The incoming sync signals also are detected by a transistor 186 which effectively applies a ground to a terminal 187 which is connected as described by the conductor 56 to the horizontal AFC apparatus 55 of FIG. 2, specifically to a terminal 188 of such apparatus a shown in FIG. 6. The ground there is applied to the junction of voltage divider resistors 189 and 191 which are connected between a positive source of voltage and ground. Such a ground applied to the terminal 188 is isolated by a diode 192 from a control terminal 193 which is connected as described by a conductor 62 to the 31.5 kHz. generator 53 of FIG. 2 for its control.

Figure 4:
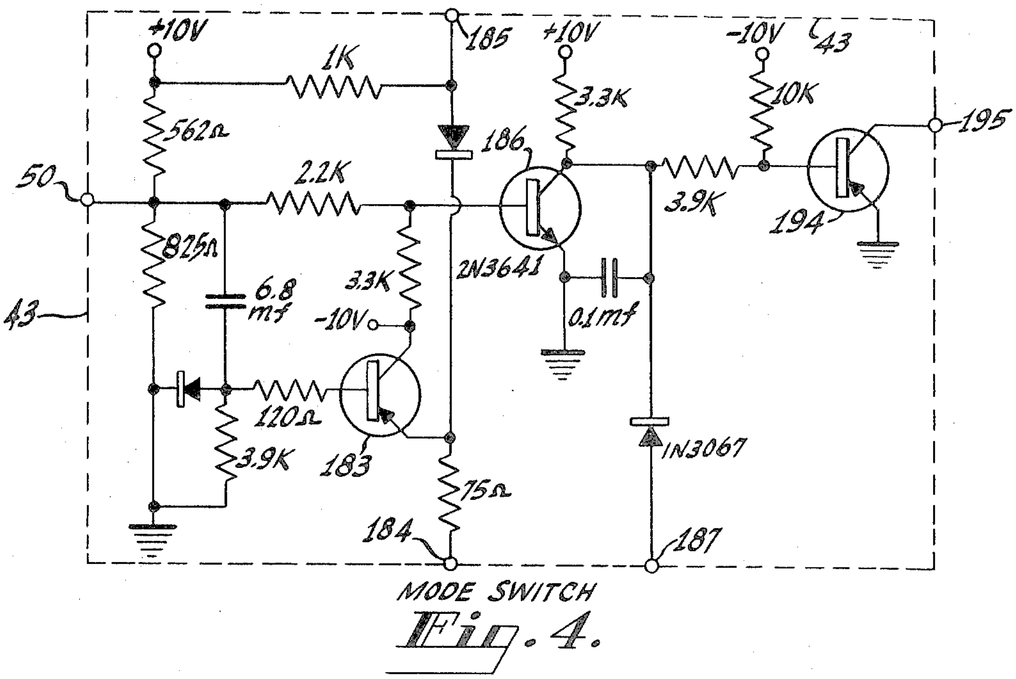
FIG. 4 is a schematic circuit diagram of the mode switch of FIG. 2.
Figure 5:
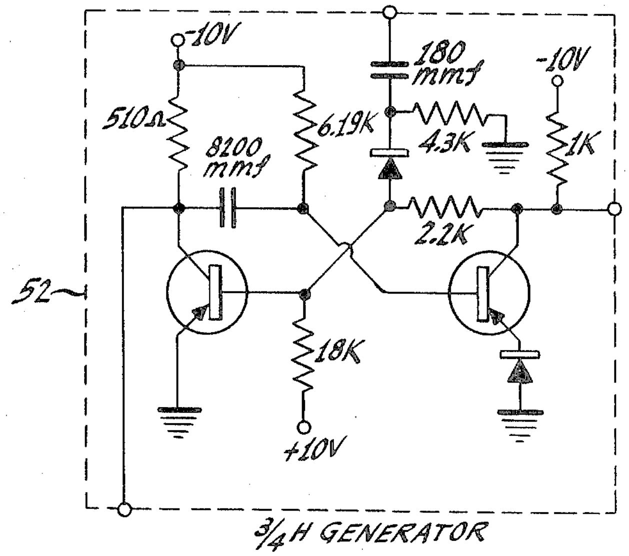
FIG. 5 is a schematic circuit diagram of a ¾H generator of FIG. 2.

The sync detector transistor 186 of FIG. 4 also operates a control transistor 194 to effectively apply a ground to a terminal 195 which is connected (as indicated but not shown) to a control terminal 196 of the composite sync generator 158 of FIG. 22. This apparatus has one output terminal 197 continuously providing the described composite sync signal though a polarity reversing transistor 198 and another output terminal 199 providing the composite sync signal through an emitter follower transistor 200 when operative. Normally, during the detected presence of an incoming sync signal by the mode switch 43 of FIG. 4, the transistor 200 is rendered inoperative by the ground applied to the control terminal 196 and, thence, to its input base circuit.

The output of the composite sync generator 158 of FIGS. 3 and 22 is looped back to the blanking generator of FIG. 2 by means of an indicated (but not shown) connection between the output terminal 199 of the composite blanking generator 158 and the input terminal 94 of the vertical counter gate 95 of FIG. 2. While an incoming sync signal is being received by the mode switch 43, however, this loop is effectively open because of the described disablement of the emitter follower transistor 200 of the composite sync generator 158.

FREE RUNNING MODE

In the event that a sync signal is not received at the input terminal 50 of the mode switch 43 for transfer to its output terminals 184 and 185, the detector and control transistors 186 and 194, respectively, become nonconducting, thereby removing the grounds from terminals 187 and 195. The ¾H generator 52, being supplied with no sync signal from the output terminal 184 of the mode switch 43, causes a failure of the horizontal AFC apparatus 55 to function. The removal of the ground from the terminal 187 of the mode switch 43, however, activates the voltage divider 189—191 of the AFC apparatus to apply a predetermined reference voltage to the control terminal 193, thereby maintaining controlled operation of the 31.5 kHz. generator 53.

The removal of the ground from terminal 195 of the mode switch 43 of FIG. 4 closes the loop from the output terminal 199 of the composite sync generator 158 of FIG. 3 to the input terminal 94 of the vertical counter gate 95 of FIG. 2. This enables the emitter follower transistor 200 of FIG. 22 to supply the sync signal output from the composite sync generator output terminal 199 to the input terminal 94 of the vertical counter gate of FIG. 2 which is no longer receiving a signal by way of conductor 93 from the output terminal 185 of the mode switch 43. The first timing edge produced by the 128 line counter 102 causes the generation of a vertical advance pulse as previously described. Also, as described, the vertical advance sync which appear as part of the composite sync signal looped back from the output terminal 199 of the composite sync generator 158 to the input terminal 94 of the vertical counter gate 95. The vertical sync signal triggers the counter gate which then functions to control the operation of other apparatus, such as the 128 line counter 102, of FIG. 2 as previously described and thereby establishes the proper relationship of the horizontal and vertical frequencies.

ADDITIONAL DATA

In the schematic circuit diagrams of FIGS. 4 to 26 the indicated values of the components are those for apparatus designed to operate in conformance with United States standards set by the Federal Communications Commission. In these FIGS. all of the transistors are 2N3638 type except where otherwise designated. Also, all diodes are 1N100 type except where otherwise designated.

The blanking and sync generating systems embodying the present invention are also susceptible of use in other television systems operating at different line and field repetition rates. .For example, with the following few component value and simple circuit changes, the apparatus is operative at the 625 line-50 cycle standards of the PAL system used in parts of Europe. In the horizontal AFC circuit 55 of FIG. 6 the reference voltage divider resistor 191 is changed from 1210 ohms to 1100 ohms so as to control the frequency of the basic timing generator 53, when in the free running mode, at double the PAL line rate. In the vertical blanking gate 115 of FIG. 16, the resistor 201 is changed from 7500 ohms to 9100 ohms to adjust the time duration of the unstable state of the gate so as to produce a gating pulse 89 of FIG. 28 approximating the time duration of the PAL vertical blanking interval. In the line counter 102 of FIG. 13 the counter reset pulse impressed upon terminal 202 from the pulse generator 99 of FIG. 2, instead of being applied to the bistable components as shown, the pulse is applied through diode 203 to terminal 204 of the 1 count component, through diode 205 to terminal 206 of the 2 count component, through diode 207 to terminal 208 of the 4 count component, through diode 207 to terminal 208 of the 4 count component, through diode 209 to terminal 211 of the 8 count component, through diode 212 to terminal 213 of the 32 count component and through diode 214 to terminal 215 of the 64 count component. The connections to the 16 count and 128 count components remain as shown. The counter thereby is enabled to make an appropriate line count for the PAL system. Finally, in the vertical sync interval gate generator 163 of FIG. 24 the value of the pulse width timing resistor 216 is changed from 11,000 ohms to 9090 ohms and a similar change is made in the value of the timing resistor 217 in the No. 2 equalizing pulse gate generator 164 of FIG. 25.

In the free-running mode of operation the blanking generator of FIG. 2 and the sync generator of FIG. 3 mutually cooperate to continuously provide a composite blanking and sync signal even in the temporary absence of an incoming signal. Nevertheless, in the locked mode of operation, each of these generators may be used independently of one another. In the case of the sync generator of FIG. 3, the timing information impressed respectively upon the input terminals 139, 142 and 165 of the front porch timing generator 140, the horizontal blanking gate 141 and the No. 1 equalizing pulse gate generator 162 may be obtained from a suitable source other than the blanking generator apparatus of FIG. 2.

I claim:

1. A blanking signal generator for a television system, comprising:
- a timing generator for producing a timing wave having a frequency equal to twice the horizontal line repetition rate of said television system;
- horizontal blanking generator means coupled to said timing generator for producing driving pulses at twice said horizontal line repetition rate;
- horizontal blanking gate means coupled to said timing generator and to said horizontal blanking generator means and normally operative in response to said timing wave for eliminating alternate ones of said driving pulses for producing a control train of driving pulses having the repetition rate of said horizontal line repetition rate;
- composite blanking signal generator means;
- means for impressing said control train of driving pulses upon said composite blanking signal generator means for producing a train of horizontal blanking signals;
- means including a counter operative in response to said timing wave to produce a timing signal just before the start of a desired vertical blanking interval;
- first pulse producing means responsive to said timing signal from said counter for producing a first gating pulse beginning just before, and ending just after, a desired vertical blanking interval;
- means for impressing said first gating pulse upon said horizontal blanking gate means to disable it for the duration of said first gating pulse, for producing a second control train of driving pulses having twice the repetition rate of said horizontal blanking signals;
- second pulse producing means responsive to said timing signal from said counter for producing a second gating pulse beginning just after the start of, and ending just before the end of, said desired vertical blanking interval; and means for impressing said second gating pulse upon said composite blanking generator means to inhibit it from producing said train of horizontal blanking signals for the duration of said second gating pulse and to cause its operation to one state by the leading edge of the last-occurring pulse of said second control train of driving pulses before the beginning of said second gating pulse and to cause its operation to a second state by the first-occurring pulse of said second control train of driving pulses after the end of said second gating pulse, thereby producing in the output of said composite blanking generator vertical blanking signals interspersed between said train of horizontal blanking signals.

2. A blanking signal generator as defined in claim 1, and additionally comprising:

a bistable blanking gate generator coupled between said horizontal blanking gate and said timing generator and responsive to successive triggers of one polarity from said timing generator to alternately open and close said horizontal blanking gate.

3. A blanking signal generator as defined in claim 2, and additionally comprising:

means to receive an incoming composite horizontal and vertical sync signal and to develop reset pulses in phase with said horizontal sync signals;

a reset pulse gate coupled between said incoming sync receiving means and said bistable blanking gate generator to receive said reset pulses;

means for impressing said horizontal blanking signals produced in the output of said composite blanking generator upon said reset pulse gate to open it periodically so that, when said produced horizontal blanking signals are not in phase with said received horizontal sync signals, one of said reset pulses is transferred to said bistable blanking gate generator to operate it to its proper state to establish cophasal relationship of said received and produced signals.

4. A blanking signal generator as defined in claim 3, and additionally comprising:

means responsive to said incoming sync signals and to said wave from said timing generator and operative to lock said timing generator in phase with said incoming sync signals.

5. A blanking signal generator as defined in claim 1, wherein:

said first gating pulse producing means includes a bistable device having one input coupled to receive said timing signal from said counter for operation to one state and another input coupled to receive said timing wave from said timing generator for operation to its original state, thereby producing a vertical advance pulse occurring just before the start of said desired vertical blanking interval and constituting the first portion of said first gating pulse.

6. A blanking signal generator as defined in claim 5, wherein:

said second gating pulse producing means includes a monostable device having an input coupled to said bistable device of said first gating pulse producing means to receive said vertical advance pulse, the trailing edge of which triggers said monostable device to its unstable state to produce said second gating pulse in its output, said second gating pulse constituting the second portion of said first gating pulse.

7. A blanking signal generator as defined in claim 6, wherein:

said first gating pulse producing means includes a normally inoperatively conditioned pulse generator having an input coupled to said monostable device of said second gating pulse producing means to receive said second gating pulse, the trailing edge of which operatively conditions said pulse generator to produce a pulse ending just after the end of said desired vertical blanking interval and constituting the third and final portion of said first gating pulse.

8. A blanking signal generator as defined in claim 7, and additionally comprising:

a vertical counter gate having an input to receive vertical sync signals and operative to produce in one output a counter reset pulse for each received vertical sync signal; and means for impressing said counter reset pulse upon said counter to condition it for proper starting in response to said timing wave from said timing generator to insure the production of said timing signal by said counter just before the start of each desired vertical blanking interval.

9. A blanking signal generator as defined in claim 8, wherein:

said counter is of a character to count effectively only a fractional number of the total number of horizontal lines in one field of the television system to produce a plurality of timing signals, only the last of which occurs just before the start of each desired vertical blanking interval;

said vertical counter gate is a monostable device and is operative to produce at a second output a gating pulse starting concurrently with each received vertical sync signal and with the production of each counter reset pulse and ending after the production by said counter of the penultimate, and before the last, one of said timing pulses; and means for impressing said gating pulse upon said vertical advance pulse producing bistable device to inhibit its operation to all but said last timing signal from said counter.

10. A blanking signal generator as defined in claim 9, wherein:

said counter is of a character to count effectively approximately one-half of the total number of horizontal lines in one field to produce a first timing signal at approximately half-field time and a second timing signal just before the start of said desired vertical blanking interval; and said monostable vertical counter gate is operative to produce said gating pulse ending at a time intermediate the production times of said first and second timing signals.

11. A composite horizontal and vertical blanking and sync signal generating system for television, comprising:

a timing signal generator for producing a timing wave having an integral multiple relationship to the horizontal line repetition rate of said television system;

horizontal blanking gate means operative to produce from said timing wave control pulses having widths and a repetition rate equal to the widths and the repetition rate of said desired horizontal blanking signals;

a composite blanking signal generator normally operative in response to said control pulses for producing said horizontal blanking signals;

vertical blanking gate means operative at the field repetition rate of said television system to render said composite blanking signal generator unresponsive to said control pulses for a period of time equal to the time duration of said desired vertical blanking intervals; thereby causing the production by said composite blanking signal generator of said vertical blanking signals;

a source of vertical sync signals;

pulse generator means coupled to said source of vertical sync signals for producing a reset pulse having a fixed delay from said vertical sync pulses;

vertical blanking gate phasing means including a line counter responsive to said timing wave and to said reset pulse to control the operative timing of said vertical blanking gate means to effect the proper phase relationship between said horizontal and vertical blanking signals produced by said composite blanking signal generator;

a composite sync signal generator operative to produce said horizontal and vertical sync signals; and means responsive to signals derived from said timing signal generator and from said vertical blanking gate phasing means for controlling the operation of said composite sync signal generator.

12. A blanking and sync signal generating system as defined in claim 11, wherein:

said source of vertical sync signals is external of said generating system.

13. A composite horizontal and vertical blanking and sync signal generating system for television, comprising:

a timing signal generator for producing a timing wave having an integral multiple relationship to the horizontal line repetition rate of said television system;

horizontal blanking gate means operative to produce from said timing wave control pulses having widths and a repetition rate equal to the widths and the repetition rate of said desired horizontal blanking signals;

a composite blanking signal generator normally operative in response to said control pulses for producing said horizontal blanking signals;

vertical blanking gate means operative at the field repetition rate of said television system to render said composite blanking signal generator unresponsive to said control pulses for a period of time equal to the time duration of said desired vertical blanking intervals; thereby causing the production by said composite blanking signal generator of said vertical blanking signals;

a composite sync signal generator operative to produce said horizontal and vertical sync signals;

vertical blanking gate phasing means including a line counter responsive to said timing wave and to vertical sync signals obtained from said composite sync signal generator to control the operative timing of said vertical blanking gate means to effect the proper phase relationship between said horizontal and vertical blanking signals produced by said composite blanking signal generator; and means responsive to signals derived from said timing signal generator and from said vertical blanking gate phasing means for controlling the operation of said composite sync signal generator.

14. A composite horizontal and vertical blanking and sync signal generating system, comprising:

a source of incoming composite horizontal and vertical sync signals;

a timing signal generator for producing a timing wave having a frequency integrally related to the desired horizontal and vertical blanking and sync signals;

blanking signal generating means for producing composite horizontal and vertical blanking signals;

sync signal generating means for producing composite horizontal and vertical sync signals; and switch means coupled to said source of incoming signals, said timing signal generator, said blanking signal generating means and said sync signal generating means, said switch means being responsive to the presence of said incoming sync signals for coupling said timing signal generator and said source of incoming sync signals to said blanking signal generating means for controlling the operation thereof, said switch means being responsive to the absence of said incoming sync signals for coupling said timing signal generator and said sync signal generating means to said blanking signal generating means for controlling the operation thereof.

15. A blanking and sync signal generating system as defined in claim 14, and additionally comprising:

means responsive to said incoming sync signals to lock said timing signal generator to said incoming sync signals; and said switch means being responsive to the absence of said incoming sync signals to effect the operation of said timing signal generator at a fixed frequency.

UNITED STATES PATENT OFFICE

CERTIFICATE OF CORRECTION

Patent No. 3,588,351 Dated June 28, 1971

Inventor(s) Leonard J. Baun

It is certified that error appears in the above-identified patent and that said Letters Patent are hereby corrected as shown below:

Column 1, line 12, that portion reading "e" should read -- be --; line 50, that portion reading "signals. Gates" should read -- signals and the equalizing pulses used in combination with the vertical sync signals. Gates --.
Column 2, line 18, delete "FIG.".
Column 3, line 31, that portion reading "y" should read -- by --; line 48, delete "g".
Column 4, line 53, that portion reading "filed" should read -- field --.
Column 7, line 68, that portion reading "sync gate" should read -- sync interval gate generator 163 to produce a vertical sync gate --.
Column 8, line 5, that portion reading "generator" should read -- generated -- .
Column 9, line 52, that portion reading "advance sync" should read -- advance pulse initiates the generation of equalizing pulses and vertical sync --.

Signed and sealed this 18th day of January 1972.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE : 1969 O—366-334